United States Patent [19]

Albouy et al.

[11] Patent Number: 4,540,852

[45] Date of Patent: Sep. 10, 1985

[54] ELECTRONIC SUBSCRIBER JUNCTOR

[75] Inventors: Pierre Albouy, Lannion; Yves Salahun, Trebeurden; François Botquin, Lannion; Roberto Cordani, Garches, all of France

[73] Assignee: Compagnie Industrielle des Telecommunications Cit-Alcatel, Paris, France

[21] Appl. No.: 496,152

[22] Filed: May 19, 1983

[30] Foreign Application Priority Data

May 19, 1982 [FR] France .................. 82 08766

[51] Int. Cl.³ ............................................. H04B 1/58
[52] U.S. Cl. ............................. 179/18 FA; 179/16 F; 179/170 NC
[58] Field of Search ........... 179/16 AA, 16 F, 18 FA, 179/70, 77, 170 NC

[56] References Cited

U.S. PATENT DOCUMENTS

| 3,823,273 | 7/1974 | Beeman et al. | 179/81 B |
|---|---|---|---|
| 4,004,109 | 1/1977 | Boxall | 179/170 NC |
| 4,272,656 | 1/1981 | Nishikawa | 179/170 NC |
| 4,300,023 | 11/1981 | Kelley et al. | 179/170 NC |
| 4,476,350 | 10/1984 | Aull et al. | 179/70 |

FOREIGN PATENT DOCUMENTS 2050114 12/1980 United Kingdom .
2093314 8/1982 United Kingdom .................. 179/70

OTHER PUBLICATIONS

IEEE Journal of Solid State Electronics, vol. SC-16, No. 4, Aug. 1981, Aull et al., pp. 261-265, "A High Voltage IC for a Transformerless Trunk and Subscriber Line Interface".
IEEE Journal of Solid State Electronics, vol. SC-16, No. 4, Aug. 1981, David P. Laude, pp. 266-269, "A Monolithic Subscriber Line Interface Circuit".
IEEE Journal of Solid States Circuits, vol. SC-16, No. 4, Aug. 1981, W. D. Pace, "A Monolithic Telephone Subscriber Loop Interface Circuit", pp. 270-278.

Primary Examiner—Gene Z. Rubinson
Assistant Examiner—Elio DiVito
Attorney, Agent, or Firm—Sughrue, Mion, Zinn, Macpeak, and Seas

[57] ABSTRACT

An electronic subscriber junctor for connecting a subscriber line to a telephone exchange, comprising an output amplifier circuit connected to the line, first means for generating a compensation voltage proportional to a common mode voltage occurring on the line and for providing a direct current proportional to a DC component of the line current, second means for obtaining a constant current, for algebraically summing said constant current and said direct current, and for supplying to the output amplifier circuit a first control current equal to said algebraic sum of the constant current and the direct current, third means for providing from said compensation voltage, via two connecting wires and on each wire, a second control current to the output amplifier circuit so as to compensate for longitudinal currents on the line, each connecting wire carrying the first control current and the output amplifier circuit delivering on each line wire a current proportional to the algebraic sum, on each connecting wire, of the first and second control currents, and an interface circuit connected to the first means and to the telephone exchange.

10 Claims, 9 Drawing Figures

ELECTRONIC SUBSCRIBER JUNCTOR

The invention concerns an electronic subscriber junctor for connecting a subscriber line to a telephone exchange.

Subscriber junctors must meet precise specifications, in particular with regard to DC and AC impedances. Their functions include providing a remote power supply to the subscriber, detecting the loop status and effecting the connection to the exchange, which may be of the two-wire or four-wire type.

Already known are electronic subscriber junctors implemented in the form of integrated circuits. These junctors are current mirrors.

In a first type of junctor the line current is sensed and processed and a line voltage produced. The control of this voltage by the line current simulates an impedance; the impedance of the power supply bridge and the dynamic impedance which are different result from different processing of the AC and DC components of the line current. In this first type of junctor, the active parts consist of three current mirrors for sensing the line current and two transistors for producing the line voltage.

The longitudinal mode current carried by each wire of the subscriber line has no effect on the operation of the junctor as it is eliminated by the system of three current mirrors, provided that it is less than the transversal current; if the longitudinal mode current becomes greater than the transversal current, the junctor no longer operates. It is also necessary to pair the mirrors sensing the current. Finally, due to the fact that the electronic components must be capable of withstanding an rms ringing voltage of 70 V superimposed on a DC supply voltage of 48 V, it is necessary to use expensive technology for the electronic components.

In a second type of junctor the line voltage is sensed and processed and a current dependent on this voltage is injected into the line. This type of junctor also uses current mirrors. When the longitudinal mode current becomes equal to or greater than the transversal current, the junctor no longer operates.

Preferred embodiments of the present invention overcome the disadvantages of known junctors and provide in particular for compensating longitudinal current whether these be less than or greater than the transversal current. Operation with battery reversal is provided for under the same conditions.

SUMMARY OF THE INVENTION

The present invention provides an electronic subscriber junctor for connecting a subscriber line to a telephone exchange and including both an input amplifier circuit generating a compensation voltage proportional to a common mode voltage occurring on the line, and an output amplifier circuit powered from a battery and having its output connected to the two wires of the subscriber line, the improvements wherein: the input amplifier circuit includes means for generating a current proportional to the line voltage; and wherein the junctor further includes: a filter having its input connected to the input amplifier and serving to separate the AC and the DC components of said current which is proportional to the line voltage by means of a single capacitive component, said filter having a first output delivering a voltage proportional to the AC component of the line voltage and second output delivering a voltage proportional to the DC component of the line voltage; first means for connecting the first filter output to the exchange and for delivering a current is proportional to the current flowing in a link to the exchange; second means connected to said first means and to said second output from the filter and including means for obtaining a constant current, and for summing said constant current with the current is delivered by the first means and also with a DC current derived from the voltage at the second output from the filter proportional the the DC component of the line voltage, the resulting algebraic sum current being applied as a first control current to said output amplifier; and third means receiving said compensation voltage and supplying a second control current to said output amplifier on each of two connecting wires, said second control current serving to compensate longitudinal currents in the line, each connecting wire having said first control current passing therethrough, and said output amplifier circuit delivering on each line wire a current proportional to the algebraic sum in each of the connection wires of said first and second control currents.

BRIEF DESCRIPTION OF THE DRAWINGS

An embodiment of the invention is described by way of example with reference to the accompanying drawings, in which.

MORE DETAILED DESCRIPTION

Figure 1:
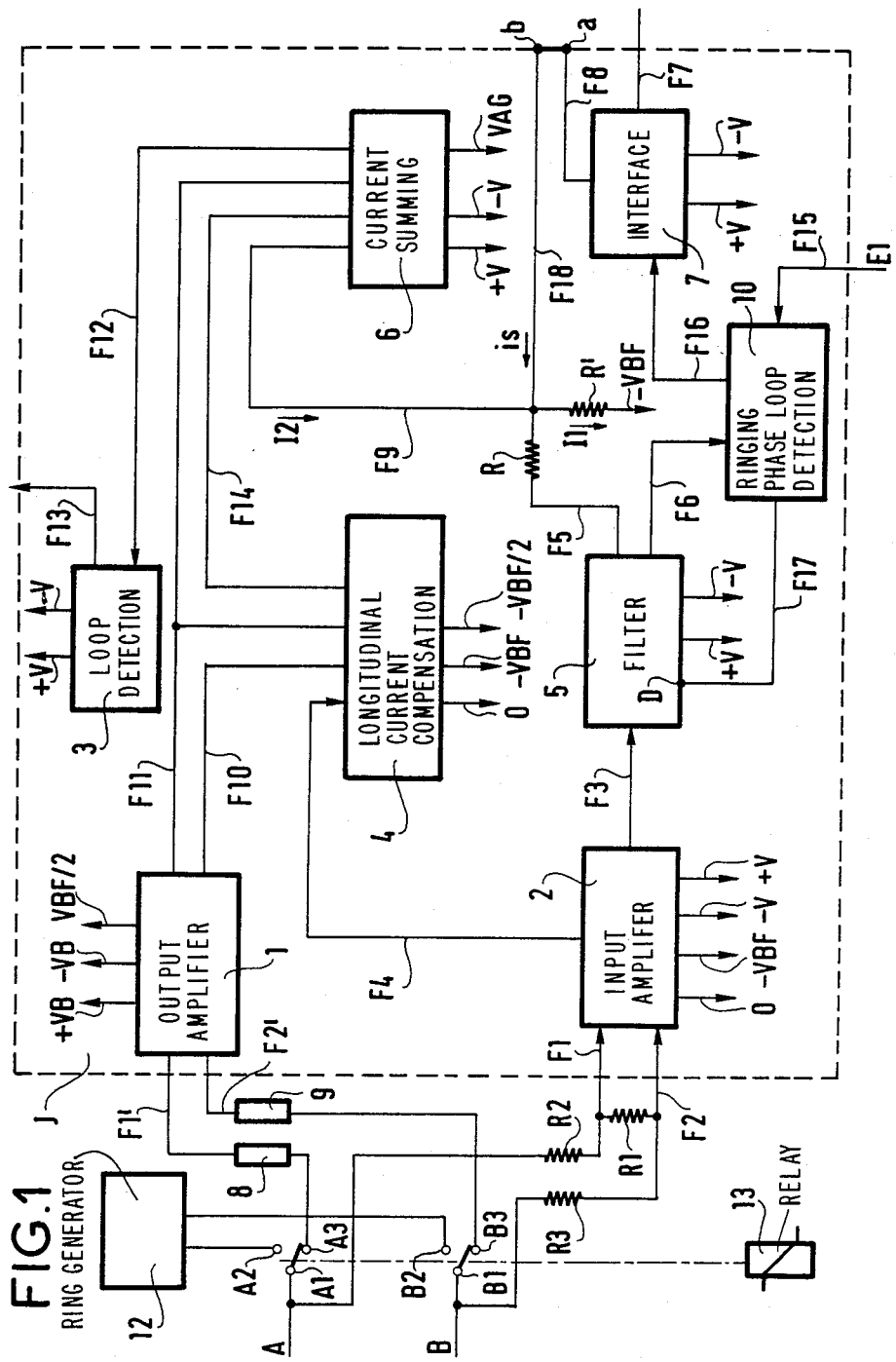
FIG. 1 is a block schematic of a junctor in acccordance with the invention.

FIG. 1 is a block diagram of a subscriber junctor J in accordance with the invention, comprising an output amplifier circuit 1, an input amplifier circuit 2, a loop detection circuit 3, a longitudinal current compensation circuit 4, a filter 5, an AC and DC current summing circuit 6, an interface circuit 7 on the exchange two-wire access side and a ringing phase loop detection circuit 10.

A subscriber line comprising wires A and B is connected to two moving contacts A1 and B1 of a ringing relay 13. A ringing generator 12 is connected to two fixed contacts A2, B2; two other fixed contacts A3 and B3 are connected to protection devices 8 and 9, respectively connected by wires F1', F2' to output amplifier circuit 1. Wires A and B of the subscriber line are connected directly to two resistors R2 and R3, respectively, themselves connected by wires F1 and F2 to the input amplifier circuit 2; a resistor R1 is connected between wires F1 and F2. Protection devices 8 and 9 are of any known type and in particular protect the junctor against current overloads; resistors R1, R2 and R3 all have high values; these various components are external to junctor J.

Input amplifier circuit 2 is connected on its output side by a wire F4 to compensation circuit 4 and by a wire F3 to filter 5, itself connected on the output side by a wire F6 to ringing phase loop detection circuit 10. Filter 5 is also connected on the output side, by a wire F5, to a resistor R connected to summing circuit 6 by a wire F9 and to a potential −VBF by a resistor R'.

Ringing phase loop detection circuit 10 is connected by a wire F16 to interface circuit 7 and by a wire F17 to a terminal D of filter 5; it is also connected to a wire F15 over which it receives a control signal E1.

Interface circuit 7 is connected to a wire F7 which, with the earth connection, constitutes a two-wire junctor access. It is also connected by a wire F8 to a terminal a; a terminal b is connected by a wire F18 to a point common to resistors R and R'; in the two-wire version terminals a and b are connected together; these two terminals a and b provide for conversion to four-wire working, however.

Output amplifier circuit 1 is connected by a wire F10 to compensation circuit 4; it is also connected, by a wire F11, to compensation circuit 4 and summing circuit 6.

Summing circuit 6 is connected by a wire F14 to compensation circuit 4 and by a wire F12 to loop detection circuit 3, the output of which is connected to a wire F13.

The various circuits 1 to 7 are connected to DC power supplies, the output voltages of which are marked −V, +V; −VB, +VB; 0, −VBF and VBF/2. The potentials −VB and +VB are those of the battery providing the power supply to the junctor. The potentials 0 and −VBF are the fixed potentials of a filtered battery voltage, potential −VBF/2 being the mid-point of the filtered battery voltage and potential 0 being earthed. The potentials −VB and +VB are symmetrical relative to potential −VBF/2. Potential VAG is that of an analogue earth; potentials −V and +V are those of a DC power supply and are symmetrical relative to potential VAG. The DC power supply providing potentials −V, +V is a low-rated power supply for the electronic processing units of the junctor. The filtered battery voltage (potentials 0, −VBF) provides a reference; no power is consumed from this supply. The battery (potentials −VB, +VB) is the power supply for the junctor; the junctor in accordance with the invention has been designed so as to be able to operate with a battery voltage equivalent only to the line voltage increased by a few volts. The advantage of the power supply arrangements selected consists in the fact that the operation of the junctor remains unchanged even if the battery voltage varies, as much for the static and common mode parameters as for the dynamic parameters. Unlike certain junctors which use a voltage variation to reduce the power dissipated in the subscriber line, with the junctor in accordance with the invention there is no variation in the average line voltage.

Figure 2:
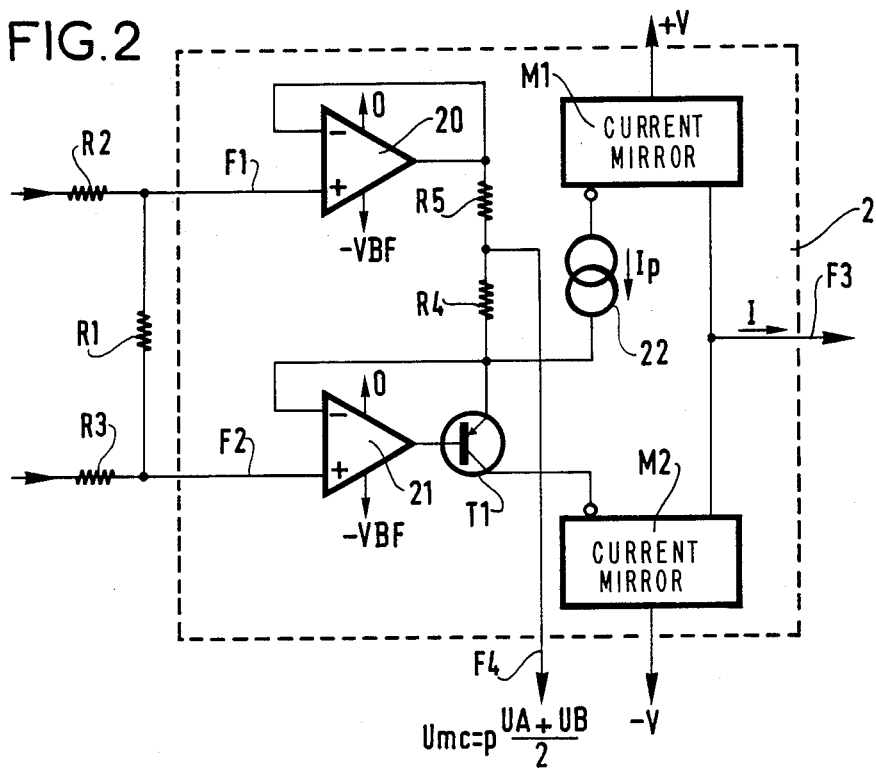
FIG. 2 shows an input amplifier circuit of the junctor shown in FIG. 1.

FIG. 2 is a block schematic of the input amplifier circuit 2 shown in FIG. 1.

Referring to this figure, 20 and 21 designate two differential amplifiers. Wire F1 is connected to a positive input of amplifier 20, the negative input of which is connected to the output. Wire F2 is connected to a positive input of amplifier 21. The output of amplifier 21 is connected to the base of a transistor T1, the emitter of which is connected to the negative input of amplifier 21 and to the output of amplifier 20 via two series-connected resistors R4, R5 of the same value; the common point of resistors R4 and R5 is connected to wire F4. Two current mirrors M1 and M2, connected to potentials +V and −V, respectively, each have an output terminal connected to wire F3; the output/input signal ratio is unity for each of current mirrors M1 and M2. Current mirror M1 has an input terminal connected through a current generator 22 to the emitter of transistor T1, the collector of which is connected to an input terminal of current mirror M2. Amplifiers 20 and 21 are connected to the filtered battery voltage (potentials, 0, −VBF).

Resistors R1, R2 and R3 constitute an attenuator network the function of which is to reduce the amplitude of signals present on the line to within the operating limits of amplifiers 20 and 21. Voltage-current conversion is then implemented by resistors R4 and R5 and transistor T1, the collector of which delivers a current proportional to the input voltage under normal bias conditions. On battery reversal and during the ringing phase, however, the current through resistors R4 and R5 is reversed; thus it is necessary for current generator 22 to generate a constant current Ip which is higher than the current due to voltage-current conversion by resistors R4, R5. The set of current mirrors M1 and M2 cancels the effect of the constant current Ip at the output (wire F3) of input amplifier circuit 2. Thus the output current is proportional to the differential voltage between wires F1 and F2, the reference for this current being the analogue earth potential VAG. Input amplifier circuit 2 therefore operates with the battery reversed and provides for registering a high differential input voltage, as is the case on loop detection during the ringing phase. It produces an output current defined by the equation:

$$I = \frac{R1\,(UA - UB)}{(R1 + R2 + R3)(R4 + R5)} = \frac{R1\,(UA - UB)}{(R1 + 2R2)\,2R4} \quad (1)$$

when R2=R3 and R4=R5.

UA and UB are the potentials on subscriber wires A and B (FIG. 1) relative to battery potential 0.

Input amplifier circuit 2 delivers, on wire F4, a voltage Umc=p(UA+UB)/2 proportional to the average value of the voltages on wires A and B, p being a coefficient of proportionality; this voltage on wire F4 is null in the absence of longitudinal current.

The input amplifier circuit has a high input impedance in comparison with the line impedance; its common mode rejection ratio need not be very high as the junctor comprises longitudinal current compensation circuit 4.

Figure 3:
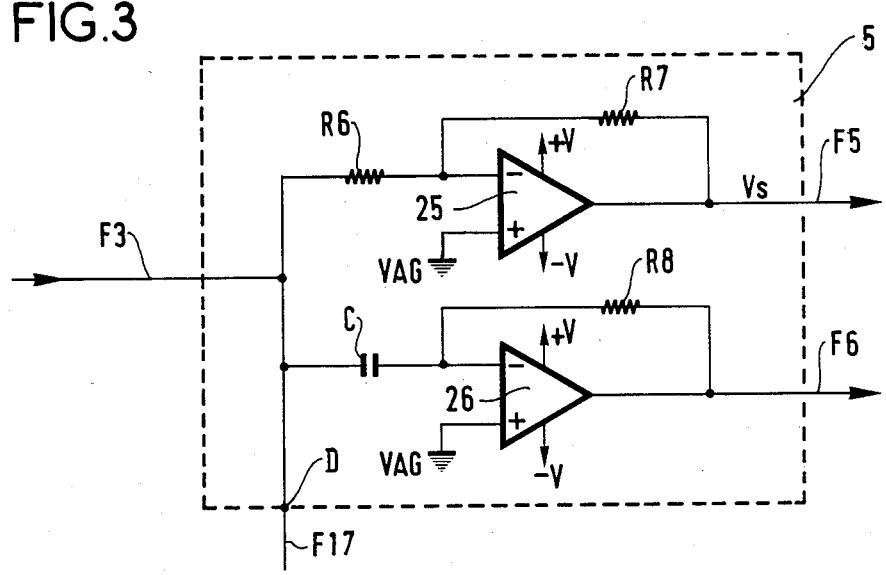
FIG. 3 shows a filter of the junctor shown in FIG. 1.

FIG. 3 shows filter 5 of FIG. 1, essentially comprising two differential amplifiers 25 and 26 each connected to the DC power supply (potentials +V, −V). Wire F3 is connected to the negative input of amplifier 25 through a resistor R6 and to the negative input of amplifier 26 through a capacitor C. The output and the negative input of amplifier 25 are connected together through a resistor R7. The output and the negative input of amplifier 26 are connected together through a resistor R8. The output of amplifier 25 is connected to wire F5 and the output of amplifier 26 is connected to wire F6.

The filter separates the DC and AC components of a signal imaging the line signal, the DC component being routed to wire F5 and the AC component being routed to wire F6. At the output of amplifier 25 is a voltage $Vs=k(UA-UB)$ where the ratio k depends on the network consisting of resistors R1, R2 and R3 and resistors R4 and R5 of input amplifier circuit 2 (FIG. 2), and on resistors R6 and R7 (FIG. 3).

The current I2 (FIG. 1) controlling the transversal current in the subscriber line is equal to: $VBF/R'-Vs/R+is$. The current is delivered by the interface circuit 7 is equal to the current flowing in wire F7 connecting the interface circuit to the exchange. For the current I2 to cancel when the difference UA−UB is equal to the battery voltage, it is necessary that $R'=R/k$ and that is is zero on average.

Amplifiers 25 and 26 and their associated circuits constitute a low-pass filter and a high-pass filter, respectively. These filters have the same cut-off frequency of $1/(2\pi \times R6 \times C)$. The following values may apply, for example: R6=R7=7,500 ohms, R8=90,000 ohms, C=300 nF, k=1/5.

Figure 8:
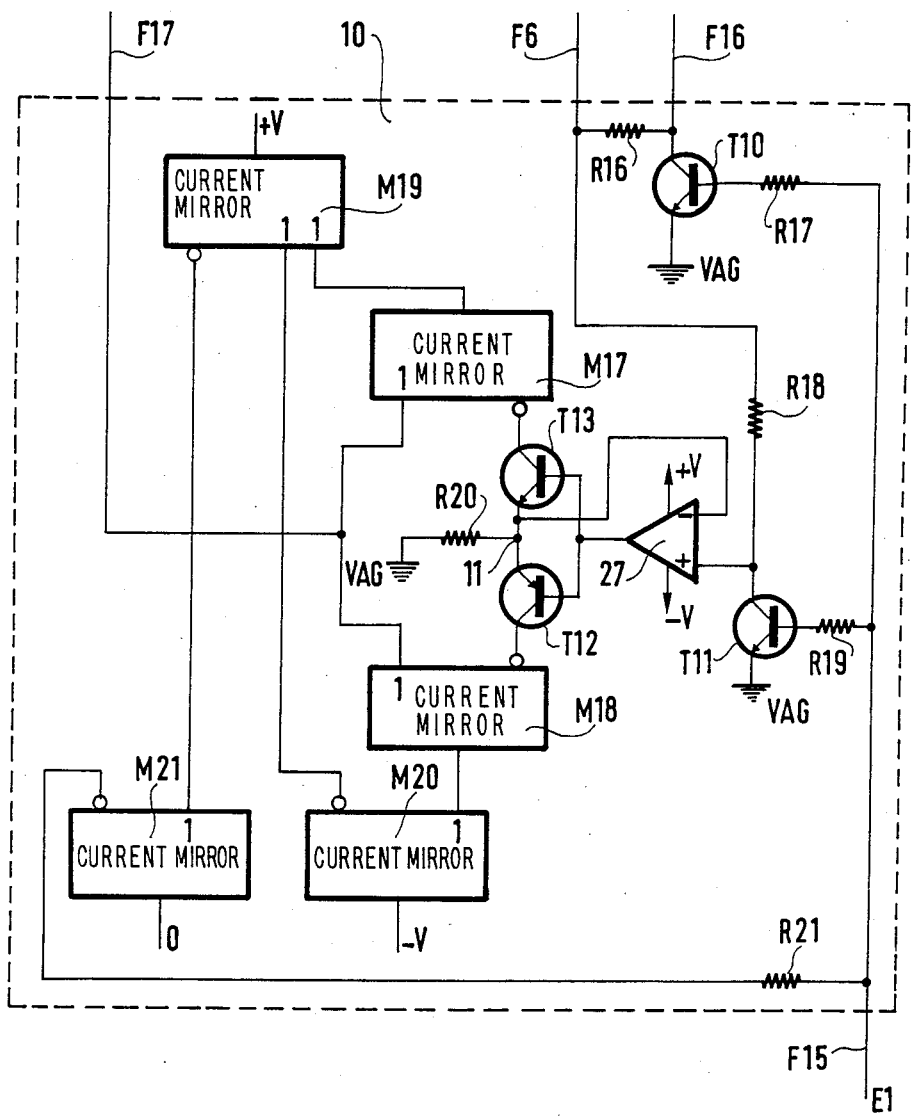
FIG. 8 shows a ringing phase loop detection circuit of the junctor shown in FIG. 1.

In the juncture in accordance with the invention loop detection is handled by loop detection circuit 3; this detection is effected by monitoring the line voltage after filtering by filter 5. In the normal supply phase this filtering is not critical as it must authorize the reading of dialled digits and attenuate the speech band which in any event contains only signals which are of low amplitude in comparison with the loop open and closed states. The problem is more delicate in the ringing phase, however; it is a question of eliminating the ringing signal which is at a relatively low frequency, 25 Hz, for example, and high amplitude. This leads to the use of a filter with a time constant which is lower than is the case with the normal supply. For this purpose, the value of capacitor C of the filter may be increased by connecting its terminal D to a capacitor through a contact of ringing relay 13 (FIG. 1), the capacitor being connected to analogue potential VAG and terminal D being connected in the filter to wire F3. It is also possible to multiply the value of capacitor C of the filter by an electronic method; this is effected by the ringing phase loop detection circuit 10 of FIG. 1, shown also in FIG. 8. In this circuit 10, wire F6 connected to the output of amplifier 26 of the filter is connected through a high-value resistor R16 to wire F16, itself connected to interface circuit 7. A transistor T10 has its collector connected to wire S16, its emitter connected to analogue potential VAG and its base connected through a resistor R17 to wire F15. A transistor T11 has its collector connected through a resistor R18 to wire F6, its emitter connected to analogue potential VAG and its base connected through a resistor R19 to wire F15. A differential amplifier 27 connected to the DC power supply (potentials +V, −V) has a positive input connected to the collector of transistor T11 and an output connected to the base of each of two transistors T12 and T13.

Transistor T13 has its collector connected to an input of a current mirror M17 and its emitter connected to the emitter of transistor T12; a point 11 common to the emitters of transistors T12 and T13 is connected to analogue potential VAG through a resistor R20 and to the negative input of amplifier 27. The collector of transistor T12 is connected to an input of a current mirror M18. The current mirrors each have an output connected to wire F17, itself connected to terminal D of filter 5. A current mirror M19 has an input connected to potential +V, an output connected to an input of current mirror M17, an output connected to an input of a current mirror M20 and an input connected to an output of a current mirror M21. Current mirror M20 has an output connected to an output of current mirror M18 and an output connected to potential −V. Current mirror M21 has an input connected to wire F15 through a resistor R21 and an output connected to potential 0. When a signal E1 is applied to wire F15 in the ringing phase, the current i delivered by amplifier 26 of filter 5 (FIG. 3) is sensed on wire F6, being proportional to the current flowing through capacitor C of the filter. This current is multiplied by amplifier 27 of circuit 10 by a factor G and re-injected through wire F17 at point D of filter 5, through the intermediary of an analogue switch comprising current mirrors M17, M18, M19, M20, M21 and transistors T12 and T13. Thus a current Gi is applied to terminal D; between terminal D of filter 5 and analogue potential VAG there is thus the equivalent of a capacitor of value (G+1)C. Ringing phase loop detection circuit 10 thus provides for obtaining a filter with greater time constant in the ringing phase, improving the filtering action and providing a better DC component on wire F5 at the output of filter 5.

Figure 4:
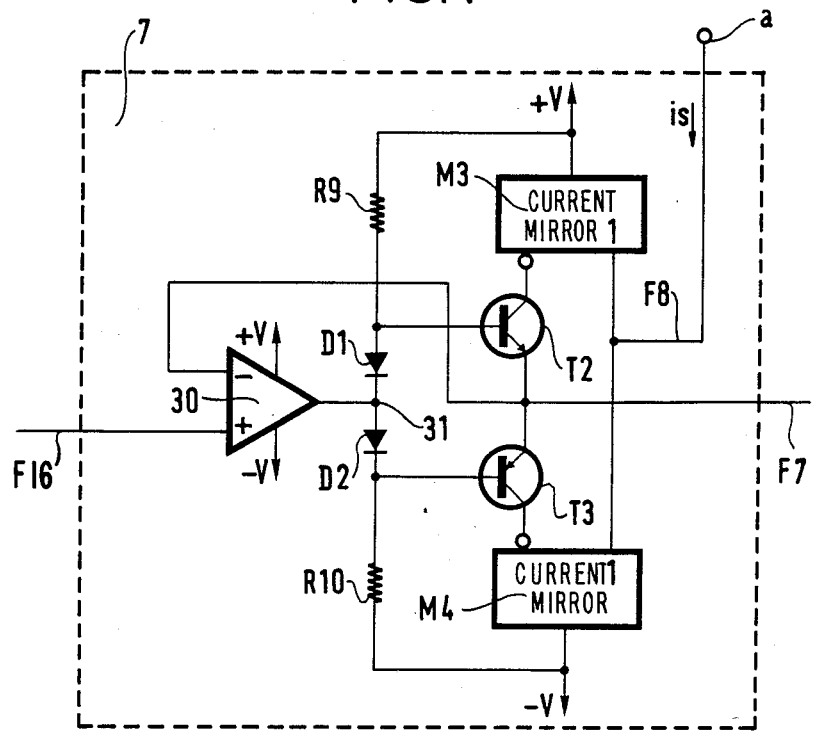
FIG. 4 shows an interface circuit of the junctor shown in FIG. 1.

FIG. 4 shows the interface circuit 7 of FIG. 1. A differential amplifier 30 has a positive input connected to wire F16 and its negative input is connected to wire F7. A series circuit comprising a resistor R9, two diodes D1, D2 and a resistor R10 is connected between potentials +V and −V; a point 31 common to the two diodes is connected to the output of amplifier 30. Two current mirrors M3 and M4 respectively connected to potentials +V and −V are each connected on the output side to wire F8; an input of current mirror M3 is connected to the collector of a transistor T2, the emitter of which is connected to wire F7; an input of current mirror M4 is connected to the collector of a transistor T3, the emitter of which is connected to wire F7. The base of transistor T2 is connected to a point common to resistor R9 and diode D1; the base of transistor T3 is connected to a point common to diode D2 and resistor R10. Transistors T2 and T3 are complementary, transistor T2 being of the NPN type and transistor T3 of the PNP type.

Amplifier 30 therefore receives over wire F16 a voltage corresponding to the AC component imaging the signal on the subscriber line, the voltage delivered on wire F7 being equal to the voltage on wire F16, amplifier 30 having unity gain. The current is in wire F8 is equal to the difference between the output currents of current mirrors M3 and M4, and thus of transistors T2 and T3, the input-output ratio for each current mirror being unity; the current in wire F8 is thus proportional to the AC component of the current in the subscriber line. It is thus possible to pass a low-value quiescent current through the transistors, which avoids distortion due to switching of these transistors. Wire F8 is connected to terminal a; as indicated in FIG. 1, this terminal is connected to a terminal b itself connected to wire F9.

Figure 5:
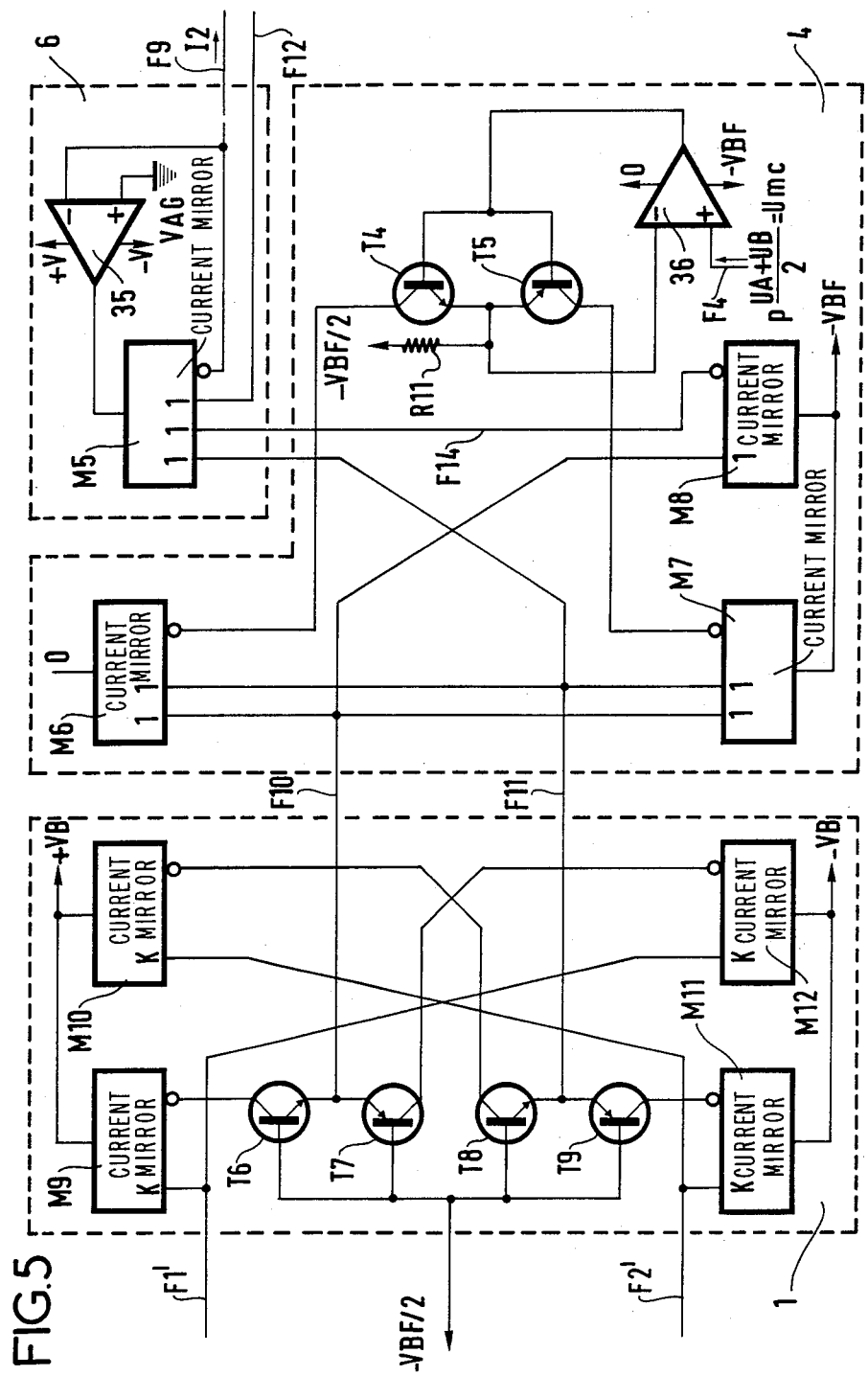
FIG. 5 shows a summing circuit, a compensation circuit an output amplifier circuit of the junctor shown in FIG. 1.

FIG. 5 shows output amplifier circuit 1, compensation circuit 4 and summing circuit 6 of FIG. 1.

Summing circuit 6 comprises a differential amplifier 35 connected to the DC power supply (potentials +V, −V) and a current mirror M5 having its power supply input connected to the output of amplifier 35 which has a positive input connected to analogue earth VAG and a negative input connected to wire F9. Current mirror M5 has an input connected to wire F9; current mirror M5 has three outputs, connected to wires F11, F12 and F14, respectively (FIG. 1). For each output the output/input signal ratio is unity. As has already been stated, filter 5 separates the AC and DC components of the signal imaging the line signal and the current I2 (FIG. 2) is equal to VBF/R'−Vs/R+is.

Wire F9 is connected to resistors R and R', in turn connected to terminal b by wire F18; terminal b being connected to terminal a itself connected to interface circuit 7, with the summing circuit 6 receiving the current is from the interface circuit.

Compensation circuit 4 comprises three current mirrors M6, M7, M8, a differential amplifier 36 and two transistors T4, T5 of NPN and PNP types, respectively. Current mirror M6 is connected to potential 0 and current mirrors M7 and M8 are connected to potential −VBF. Current mirror M8 has an input connected by wire F14 to an output of current mirror M5 of summing circuit 6; it has an output connected to wire F10, the output/input signal ratio being equal to unity.

Differential amplifier 36 has a positive input connected by wire F4 to input amplifier circuit 2 (FIG. 2) which therefore receives a signal p.(UA+UB)/2 and a negative input connected to potential −VBF/2 through a resistor R11 and to the emitters of two transistors T4 and T5. Transistor T4 has its collector connected to an input of current mirror M6 and transistor T5 has its collector connected to an input of current mirror M7. The bases of transistors T4 and T5 are connected together and to the output of differential amplifier 36 which is connected to the filtered battery voltage (potentials 0, −VBF). Each of current mirrors M6 and M7 has two outputs connected to output amplifier circuit 1 by wires F10 and F11; the output/input signal ratio is equal to unity for each of the outputs of current mirrors M6 and M7.

Output amplifier circuit 1 comprises four current mirrors M9, M10, M11, M12 and a routing network consisting of four transistors T6, T7, T8, T9 of types NPN, PNP, NPN and PNP, respectively. The emitters of transistors T6 and T7 are connected together and to wire F10; the emitters of transistors T8 and T9 are connected together and to wire F11.

The bases of transistors T6, T7, T8, T9 are connected to potential −VBF/2. The collector of transistor T6 is connected to an input of current mirror M9; the collector of transistor T7 is connected to an input of current mirror M12; the collector of transistor T8 is connected to an input of current mirror M10; the collector of transistor T9 is connected to an input of current mirror M11. Current mirrors M9 and M12 each have an output connected to wire F1'; current mirrors M10 and M11 each have an output connected to wire F2'. The output/input signal ratio is equal to K for each of current mirrors M9, M10, M11, M12.

Summing circuit 6, compensation circuit 4 and output amplifier circuit 1 provide for obtaining a current in each wire F1' and F2', and thus in each wire A and B of the line (FIG. 1) from the current I2 in wire F9.

Figure 6:
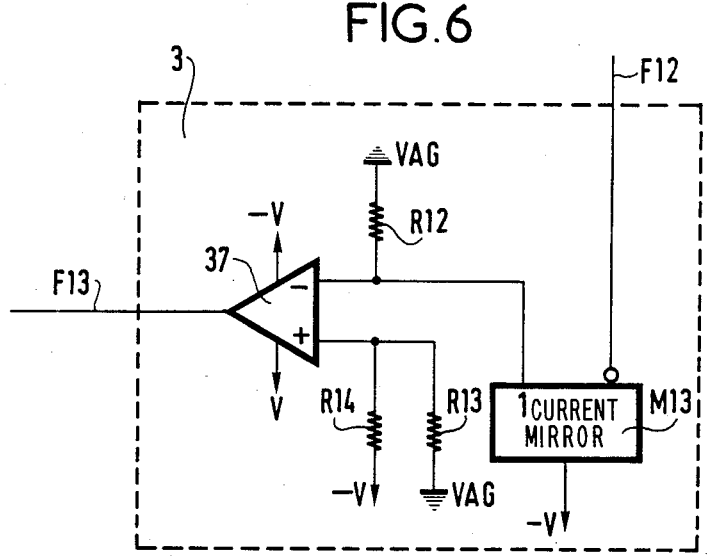
FIG. 6 shows a loop detection circuit of the junctor shown in FIG. 1.

FIG. 6 shows the loop detection circuit 3 of FIG. 1, which essentially comprises a current mirror M13 and a differential amplifier 37 connected to potentials +V, −V. An input of current mirror M13 is connected by wire F12 to an output of current mirror M5 of summing circuit 6 shown in FIG. 5. An output of current mirror M13 is connected to a negative input of differential amplifier 37 and through a resistor R12 to potential VAG; current mirror M13 is also connected to potential −V. A positive input of differential amplifier 37 is connected to potential VAG by a resistor R13 and to potential −V by a resistor R14. The output of differential amplifier 37 is connected to wire F13 which constitutes an output of the junctor and carries a signal when loop detection circuit 3 has detected closing of the subscriber line as a result of raising the telephone handset. Differential amplifier 37 may with advantage be replaced by a hysteresis comparator so as to differentiate between the off-hook and on-hook thresholds.

Figure 7:
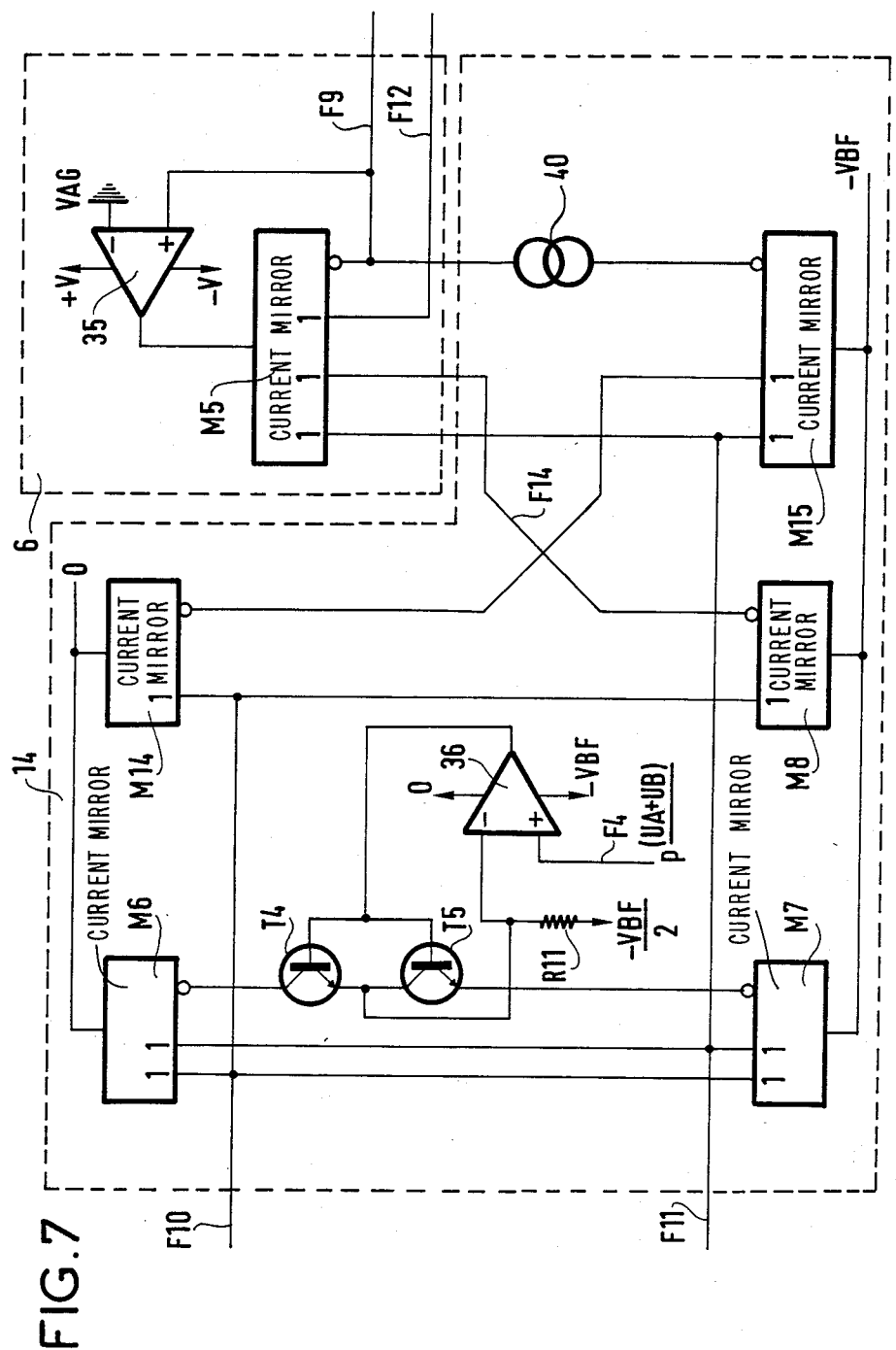
FIG. 7 shows a variant of the summing circuit shown in FIG. 5.

FIG. 7 shows a variant of the compensation circuit 4 of FIG. 5, providing for reversal of the battery supplying the junctor. It has already been described how compensating for longitudinal currents higher than the transversal current required a set of four current mirrors in output amplifier circuit 1 (FIG. 5); the currents in wires A and B of the subscriber line, and thus in wires F1' and F2' of output amplifier circuit 1, may flow in either direction, this providing for battery reversal. To this end, the part corresponding to the control of current mirrors M9, M10, M11 and M12 of output amplifier circuit 1, that is to say compensation circuit 4 of FIG. 5, must be modified.

FIG. 7 also shows summing circuit 4 of FIG. 5, this circuit not being modified. In FIG. 7, compensation circuit 14 comprises current mirrors M6, M7, M8, M14, M15, transistors T4 and T5, a differential amplifier 36, a resistor R11 and a bias circuit 40. With the exception of current mirrors M14 and M15 and bias circuit 40, all other components and their interconnections are the same as in FIG. 5. Current mirror M14 has an output connected to wire F10 and to the output of current mirror M8, and an input connected to an output of current mirror M15. Current mirror M15 has another output connected to wire F11 and to an output of current mirror M5, and an input connected to the input of current mirror M5 through the intermediary of bias circuit 40. Current mirror M14 is connected to potential 0 and current mirror M15 is connected to potential −VBF.

The junctor in accordance with the invention is a current generator system in which the current is a function of the line voltage and the output current.

The differential line voltage is sensed by input amplifier circuit 2 which delivers at its output, on wire F3, a current I defined by equation (1) and applied to filter 5.

As the differential line voltage comprises a DC component and an AC component, filter 5 separates these. At the output of the filter there is a voltage Vs on wire F5 which creates, through resistor R (FIG. 1), a current which in wire F9 opposes the current generated by the filtered battery voltage through resistor R', so that the resulting current in wire F9 is the current I2 equals VBF/R'−Vs/R+is; the DC component of the current I2 being equal to VBF/R'−Vs/R.

The current mirrors of the output amplifier circuit 1 multiply the DC component of this current by a coefficient K. Thus if IT designates the transversal current in the subscriber line:

$$IT = KI1 = \frac{KVBF}{R'} - \frac{K V_s}{R}$$

where Vs=k(UA−UB).

For a null line voltage UA−UB=0:

$$IT_{max} = K \times VBF/R'$$

For a null line current IT:

$$UA-UB = R/R' \times VBF/k$$

Figure 9:
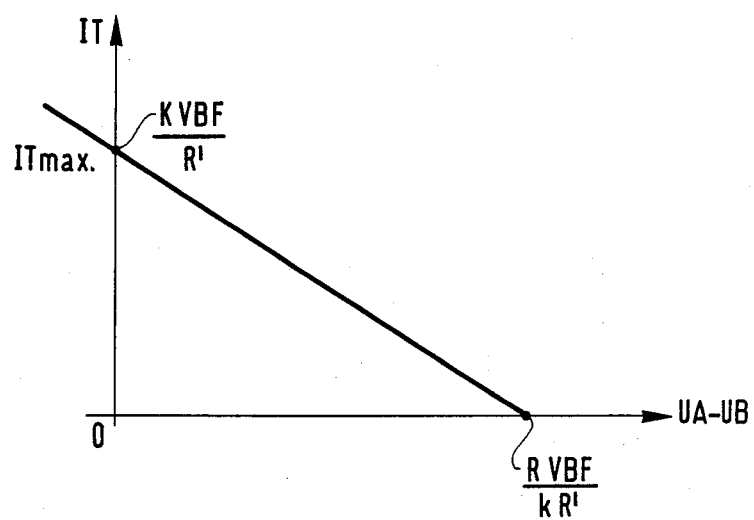
FIG. 9 is a curve showing the transversal current as a function of the line voltage for the junctor shown in FIG. 1.

FIG. 9 shows the function IT=f(UA−UB) which is a linear function to which current limiting may be applied, for example by limiting the voltage Vs=k(UA−UB) at the output of filter 5. Coefficient k depends on the attenuator network consisting of resistors R1, R2 and R3 (FIG. 1) and resistors R4 and R5 (FIG. 2); the static characteristic of the junctor in accordance with the invention is thus set by coefficient k and the filtered battery voltage (0, −VBF), and it is a simple matter to modify these parameters to obtain operation under normal battery conditions, with battery reversed and in purely resistive mode with no battery.

The AC component of the line voltage is transferred to the junctor two-wire output through filter 5 and interface circuit 7; this AC component is therefore found on wire F7 at the output of the interface circuit which senses, by means of current mirrors M3 and M4, the current on wire F7, which it re-injects via wires F8, F18 and F9 into summing circuit 6 which also receives the DC component of the subscriber line current from filter 5. There are thus found on the subscriber line two current components, a DC component and an AC component, resulting from two different processing actions on the two components of the line voltage. From the dynamic point of view, this is therefore equivalent to a transformer, since the output voltage is proportional to the input voltage and the currents are also interrelated. The impedance of the subscriber line seen from the junctor input is therefore dependent on the junctor output impedance.

In operation as described above, the junctor behaves from the dynamic point of view as a transformer and, as such, the subscriber line side input presents a high impedance insofar as the common mode is concerned. On the line accesses there are two current sources, one per line wire, consisting of output amplifier circuit 1 and input amplifier circuit 2. Under these conditions, if a common mode voltage is applied to the line the output of the input amplifier circuit will not deliver any signal and there will be no feedback effect on the common mode voltage. The common mode impedance of the junctor will therefore be high and will not therefore offer any opposition to longitudinal disturbances on the line. Were these longitudinal disturbances sufficiently strong to bring about voltages on line wires A and B outside the range between the battery supply voltages +VB and −VB, the junctor would no longer operate. Also, as it is difficult to achieve a balance between two current sources, an implementation with no common mode disturbance compensation circuit would be bound to fail; this is why the junctor in accordance with the invention comprises a compensation circuit 4.

The operation of the junctor will now be described, and more particularly that of compensation circuit 4 in the presence of longitudinal disturbances. As has already been indicated, in the absence of any correction a longitudinal disturbance would give rise to a common mode voltage. Thus if it were possible to "sense" this common mode voltage and to create a longitudinal current opposing the disturbance, an impedance to common mode signals would thus be created; this impedance would be a function of the gain of the feedback loop and therefore adjustable so that disturbing signals would not give excessively high values of common mode voltage.

The common mode voltage p(UA+UB)/2 is delivered by input amplifier circuit 2 on wire F4. The feedback loop consists of compensation circuit 4 and output amplifier circuit 1. Wires F10 and F11 (FIG. 5) carry two currents which control the line currents in F1' and F2' via transistors T6 to T9 and current mirrors M9 to M12. The currents in wires F10 and F11 result from the currents produced by current mirrors M5 and M8 or (in the case of battery reversal, FIG. 7) by current mirrors M5, M8 and M14, M15, these currents being equal and in opposite directions, and by current mirrors M6 and M7 (FIGS. 5 and 7), these currents being equal and in the same direction. In consequence, the currents resulting on wires F10 and F11, which are applied to the routing network consisting of the four transistors T6 to T9, are such that their half-sum remains constant irrespective of the value of the correction currents produced by current mirrors M6 and M7. Thus, through action by current mirrors M6 and M7, it is possible to change the value of the longitudinal subscriber line current IA−IB, where IA and IB designate the currents in line wires A and B, respectively, without changing the value of the transversal current, since:

$$\frac{IA + IB}{2} = \frac{K(IF10 + IF11)}{2} = \text{constant}$$

where IF10 and IF11 designate the currents in wires F10 and F11.

This correction of the longitudinal current is effected by current mirrors M6 and M7 and is controlled by the common mode voltage p.(UA+UB)/2 from input amplifier circuit 2. This voltage generates a current in resistor R11, the direction of which is sensed by transistors T4 and T5, and which is passed on by current mirrors M6 and M7. It is a simple matter to demonstrate that the common mode impedance created by the feedback loop, which is given by the common mode voltage/longitudinal current ratio, has the value R11/K.

The paths taken by the currents in wires F10 and F11, according to the relative values of the transversal and longitudinal currents in the line, are as follows.

(a) No longitudinal disturbance

In this case there is no common mode voltage, transistors T4 and T5 are cut off and there is no current in resistor R11 or in current mirrors M6 and M7. Wires F10 and F11 therefore carry two currents which are equal and in opposite directions, from current mirrors M5 and M8 (FIG. 5) or either from current mirrors M5 and M8 or from current mirrors M14 and M15 in the case of FIG. 7 in which compensation circuit 4 is provided for operation with battery reversal. According to the direction of the currents in wires F10 and F11, it is transistors T6 and T9 and current mirrors M9 and M11 or transistors T7 and T8 and current mirrors M10 and M12 which operate.

(b) Low-amplitude longitudinal disturbance

In this case the disturbance creates a common mode voltage which is either positive or negative relative to potential −VBF/2. According to the direction of the disturbance, the current in resistor R11 flows either through transistor T4 or through transistor T5, to create current in current mirror M6 or M7 (FIGS. 5 and 7). The currents in wires F1' and F2' at the output of output amplifier circuit 1 are therefore unequal, but the direction remains the same as in the case where there was no longitudinal disturbance.

(c) High-amplitude longitudinal disturbance

These have the same effect on current mirrors M6 and M7 as low amplitude disturbances. The amplitudes of the currents produced by current mirrors M6 and M7 are higher than previously, however, and may be higher than the current flowing in wires F10 and F11 in the absence of any disturbance; in this case there are obtained in wires F10 and F11 two unequal currents in the same direction. Thus, and according to the relative direction of the transversal current and the longitudinal disturbance, it is current mirrors M9 and M10 or current mirrors M11 and M12 which operate, according to the routing action of transistors T6 to T9, dependent on the direction of the currents in wires F10 and F11 connecting compensation circuit 4 to output amplifier circuit 1.

The junctor in accordance with the invention offers a number of characteristics and advantages. Being based on current mirrors, amplifiers and transistors it is readily implemented in integrated circuit form. The performance of the junctor in terms of compensating longitudinal currents depends essentially on resistors R4 and R5 of input amplifier circuit 2. The junctor behaves as a transformer, but it has been shown that it can be operated as a transformer whose impedance is not related to its voltage gain. Compensation of longitudinal disturbances is limited only by the technological capabilities of the components in terms of power rating, and compensation of longitudinal currents is effected independently of the magnitude of the transversal current.

The junctor comprises a part supplied from the battery, which acts as a reference and sets its characteristics, and a part connected to power supplies with no influence on its operation.

As the junctor includes an output amplifier circuit 1 comprising current mirrors operating as source and absorber on wires A and B of the subscriber line, it is a simple matter to operate the junctor with normal power supply, with battery reversed and with null battery voltage. In this latter case, the junctor behaves as a transformer, with no DC characteristic. The junctor detects the subscriber loop in the normal phase or in the ringing phase, and in the latter case the ringing phase loop detection circuit 10 provides for the use of an additional capacitor; the ringing phase loop detection circuit may be implemented as an integrated circuit, as can the other circuits of the junctor.

We claim:

1. An electronic subscriber junctor for connecting a subscriber line to a telephone exchange and including both an input amplifier circuit generating a compensation voltage (Umc) proportional to a common mode voltage occurring on the line, and an output amplifier circuit powered from a battery and having its output connected to the two wires of the subscriber line, the improvements wherein:
the input amplifier circuit includes means for generating a current proportional to the line voltage;
and wherein the junctor further includes:
a filter having its input connected to the input amplifier and serving to separate the AC and the DC components of said current which is proportional to the line voltage by means of a single capacitive component, said filter having a first output delivering a voltage proportional to the AC component of the line voltage and second output delivering a voltage proportional to the DC component of the line voltage;
first means for connecting the first filter output to the exchange and for delivering a current is proportional to the current flowing in a link to the exchange;
second means connected to said first means and to said second output from the filter and including means for obtaining a constant current, and for summing said constant current with the current is delivered by the first means and also with a DC current derived from the voltage at the second output from the filter proportional the DC component of the line voltage, the resulting algebraic sum current being applied as a first control current to said output amplifier; and
third means receiving said compensation voltage and supplying a second control current to said output amplifier on each of two connecting wires, said second control current serving to compensate longitudinal currents in the line, each connecting wire having said first control current passing therethrough, and said output amplifier circuit delivering on each line wire a current proportional to the algebraic sum in each of the connection wires of said first and second control currents.

2. An electronic subscriber junctor according to claim 1, wherein said input amplifier circuit comprises two differential amplifiers each powered from a filtered battery voltage and each having one input connected to a respective one of the subscriber line wires, the outputs of the amplifiers being connected together by a series circuit comprising two resistors and the emitter-base junction of a transistor, a point common to the two resistors supplying the compensation voltage to a first wire, and wherein said means for generating a current proportional to the line voltage comprise two current mirrors powered from a DC supply, a control input of one current mirror being connected by a current generator to the emitter of the transistor, a control input of the other current mirror being connected to the collector of the transistor, and an output of each current mirror being connected to the filter by a second wire carrying a direct current proportional to the line voltage.

3. An electronic subscriber junctor according to claim 1, wherein the filter comprises first and second differential amplifiers powered from a DC supply and each having a positive input connected to an analog earth potential, the first amplifier having a negative input connected by a resistor to the means generating a DC current proportional to the line voltage and by a feedback resistor to its output which is itself connected by another resistor to the second means, the second amplifier having a negative input connected by said capacitor to the input amplifier circuit and by a feedback resistor to its output.

4. An electronic subscriber junctor according to claim 1, wherein the second means comprise a summing circuit and a resistor, said summing circuit comprising a differential amplifier and a current mirror, the differential amplifier being powered by a DC supply and having a negative input connected through the resistor to a negative potential of a filtered battery voltage and through another resistor to the second output from the filter providing the DC component of the line voltage, a positive input connected to an analog earth potential, and an output connected to a power supply input of the current mirror, which has a control input connected to the negative input of the amplifier, a first output connected to one of the connecting wires, and another output connected to the third means.

5. An electronic subscriber junctor according to claim 1, wherein the third means comprise a compensation circuit for longitudinal currents comprising first, second and third current mirrors, a differential amplifier powered from a filtered battery voltage, and two series-connected transistors, the amplifier having a positive input connected to the input amplifier circuit from which it receives the compensation voltage, a negative input connected to the emitters of the transistors and through a resistor to a mid-point potential of the filtered battery voltage, and an output connected to the bases of the transistors, a control input of the first current mirror being connected to the collector of one transistor and a control input of the second current mirror being connected to the collector of the other transistor, one output of each of the first, second and third current mirrors being connected to one of the connecting wires, another output of each of the first and second current mirrors being connected to the other connecting wire which is itself connected to the second means, the first current mirror having a power supply input connected to a positive potential of the filtered battery voltage, the second and third current mirrors having a power supply input connected to the negative potential of the filtered battery voltage.

6. An electronic subscriber junctor according to claim 1, wherein the output amplifier circuit comprises first, second, third and fourth current mirrors and a routing network consisting of first, second, third and fourth transistors, the first and second current mirrors having a power supply input connected to the positive potential of a battery and the third and fourth current mirrors having a power supply input connected to the negative potential of the battery, and the first transistor having its collector connected to a control input of the first current mirror and its emitter connected to the emitter of the second transistor, the collector of which is connected to a control input of the fourth current mirror, the third transistor having its collector connected to a control input of the second current mirror and its emitter connected to the emitter of the fourth transistor which has its collector connected to a control input of the third current mirror, the bases of the four transistors being connected to the mid-point potential of the filtered battery voltage, the emitters of the first and second transistors being connected by one of the connecting wires to the third means and the emitters of the third and fourth transistors being connected by the other connecting wire to the second and third means, an output of the first and fourth current mirrors being connected to one of the subscriber line wires, and an output of the second and third current mirrors being connected to the other wire of the subscriber line, the four current mirrors all having the same coefficient of amplification.

7. An electronic subscriber junctor according to claim 5, wherein the compensation circuit further comprises fourth and fifth current mirrors, the fourth current mirror having a power supply input connected to the positive potential of the filtered battery voltage and an output connected to one of the connecting wires, the fifth current mirror having a power supply input connected to the negative potential of the filtered battery voltage, an output connected to the other connecting wire and to an output of the second means, another output connected to the control input of the fourth current mirror, and an input connected through a current generator to an input of the second means.

8. An electronic subscriber junctor according to claim 4, wherein the first means comprise a differential amplifier, first and second current mirrors and first and second transistors, the amplifier being powered by a DC supply and having a positive input connected to the first output of the filter delivering a voltage proportional to the AC component of the line voltage, the first current mirror having a power supply input connected to the positive voltage of the DC supply, the second mirror having a power supply input connected to the negative voltage of the DC supply, a series circuit consisting of a first resistor, a first diode, a second diode and a second resistor being connected between the positive and negative voltages of the DC supply and a point common to the two diodes being connected to the output of the amplifier, the first transistor having its collector connected to a control input of the first current mirror and its emitter connected to the emitter of the second transistor, the collector of which is connected to a control input of the second current mirror, the base of the first transistor being connected to a point common to the first resistor and the first diode, the base of the second transistor being connected to a point common to the second diode and the second resistor, the emitters of the transistors being connected to the negative input of the amplifier and to a wire connecting the first means to the telephone exchange, and the two current mirrors having an output connected by a link to the negative input of the amplifier of the second means and to a control input of the current mirror of the second means.

9. An electronic subscriber junctor according to claim 3, wherein the output of the second amplifier of the filter is connected to the first means through a resistor of a ringing phase loop detection circuit which comprises means which, under the control of a signal associated with the sending of a ringing signal over the subscriber line, connect said output of the second amplifier to the analog earth potential through said resistor and deliver a current to the second amplifier through the capacitor, so as to improve the filtering action by electronically enhancing the value of the capacitor.

10. An electronic subscriber junctor according to claim 1, further comprising a loop detection circuit comprising a current mirror and a differential amplifier, the current mirror having a control input connected to an output of the second means, a power supply input connected to a negative voltage of the DC supply, and an output connected to an analog earth potential by a first resistor and to a negative input of the amplifier, the positive input of which is connected to the analog earth potential by a second resistor and to the negative voltage of the DC supply by a third resistor, the amplifier being powered from the DC supply and its output constituting the output of the loop detection circuit.

* * * * *